(12) United States Patent
Okazaki

(10) Patent No.: US 9,237,272 B2
(45) Date of Patent: Jan. 12, 2016

(54) IMAGING APPARATUS AND METHOD FOR DISPLAYING CAPTURED IMAGE WITH DIFFERENT COLORS ASSOCIATED WITH DISTANCES

(71) Applicant: PANASONIC CORPORATION, Osaka (JP)

(72) Inventor: Yoshinori Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/276,962

(22) Filed: May 13, 2014

(65) Prior Publication Data

US 2014/0347541 A1 Nov. 27, 2014

(30) Foreign Application Priority Data

May 22, 2013 (JP) ................................ 2013-107717
Apr. 25, 2014 (JP) ................................ 2014-091011

(51) Int. Cl.
*H04N 5/232* (2006.01)
*H04N 5/222* (2006.01)

(52) U.S. Cl.
CPC ....... *H04N 5/23293* (2013.01); *H04N 5/23212* (2013.01); *H04N 5/23216* (2013.01); *H04N 5/23245* (2013.01)

(58) Field of Classification Search
CPC .......... H04N 5/23293; H04N 2101/00; H04N 5/232; H04N 5/2112; H04N 5/2251; H04N 5/23212; H04N 5/23219; G03B 13/36; G02B 7/28

USPC ........................ 348/345–357, 333.01–333.99
See application file for complete search history.

(56) References Cited

U.S. PATENT DOCUMENTS

| 8,059,183 | B2 * | 11/2011 | Seto .......................... 348/333.04 |
| 2007/0285528 | A1 * | 12/2007 | Mise et al. ................. 348/222.1 |
| 2009/0102960 | A1 | 4/2009 | Tsuchiya |
| 2010/0166405 | A1 * | 7/2010 | Moon ............................ 396/104 |
| 2013/0010067 | A1 | 1/2013 | Veeraraghavan et al. |

FOREIGN PATENT DOCUMENTS

| JP | 08-286253 A | 11/1996 |
| JP | 2003-241067 A | 8/2003 |
| JP | 2009-103912 A | 5/2009 |
| JP | 2013-021682 A | 1/2013 |

* cited by examiner

*Primary Examiner* — Tuan Ho
*Assistant Examiner* — Selam Gebriel
(74) *Attorney, Agent, or Firm* — McDermott Will & Emery LLP

(57) ABSTRACT

An imaging apparatus which is effective to make it easier to manually adjust a focus is provided. An imaging apparatus has: a display unit; an image capturing unit configured to capture a subject image which is formed on an imaging plane and to output image data; a distance information obtaining unit configured to obtain distance information of a single subject or each of a plurality of subjects in the image data; and a display controller configured to display an image on the display unit. The display controller is configured to associate a plurality of different colors respectively with a plurality of areas partitioned according to distances from the imaging apparatus, determine based on the distance information to which one of the plurality of areas each subject corresponds, and display on the display unit each captured subject with the color associated with the area corresponding to the each captured subject.

11 Claims, 9 Drawing Sheets

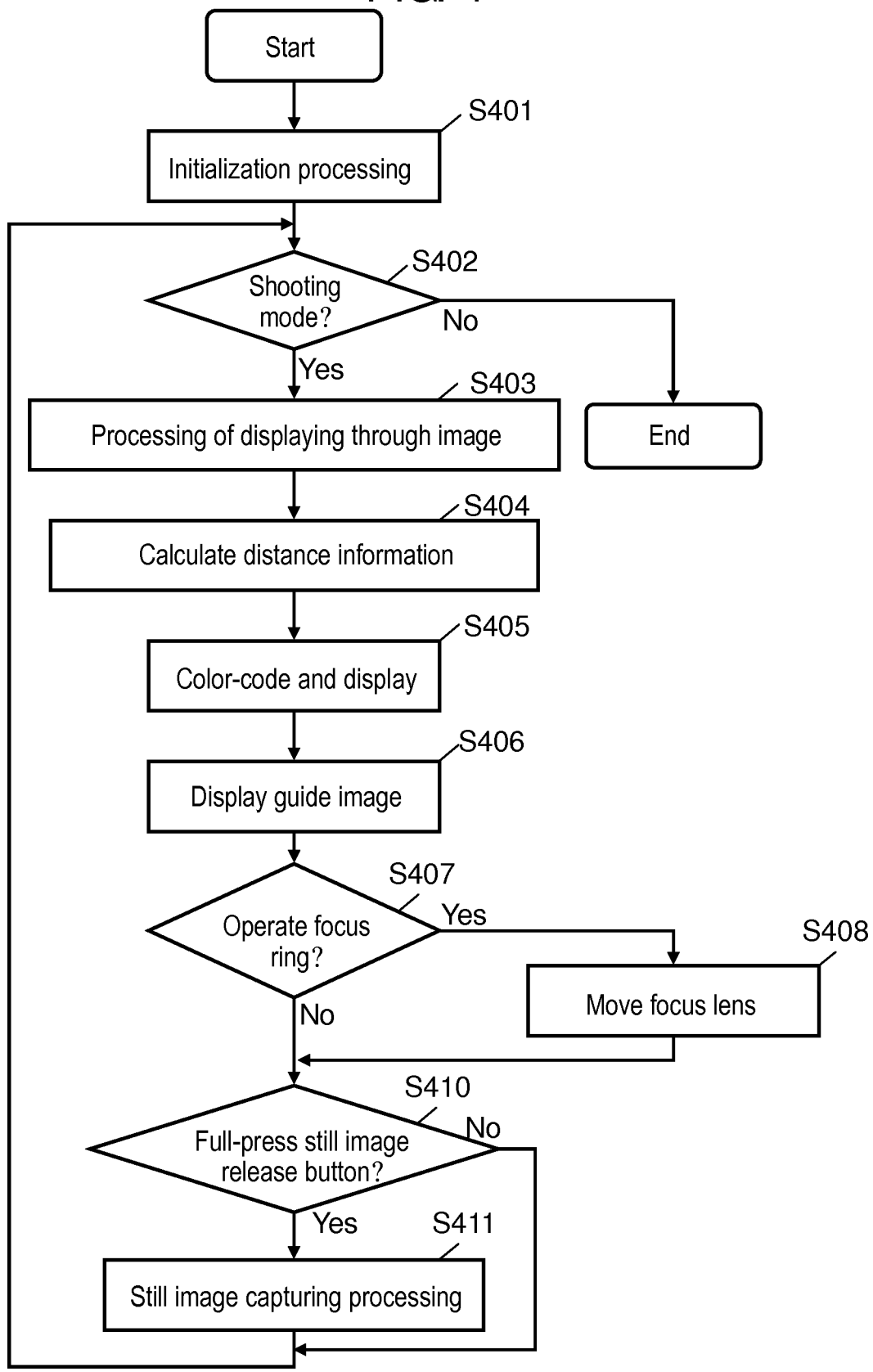

IMAGING APPARATUS AND METHOD FOR DISPLAYING CAPTURED IMAGE WITH DIFFERENT COLORS ASSOCIATED WITH DISTANCES

RELATED APPLICATIONS

This application claims the benefit of Japanese Application No. 2013-107717, filed on May 22, 2013 and Japanese Application No. 2014-091011, filed on Apr. 25, 2014, the disclosures of which Applications are incorporated by reference herein.

BACKGROUND OF THE INVENTION

1. Field of the Invention

The present disclosure relates to an imaging apparatus which has a manual focus (MF) function.

2. Background Art

Unexamined Japanese Patent Publication No. 2009-103912 discloses an imaging apparatus which has a manual focus function for allowing a user to manually adjust focus. According to this imaging apparatus, when the user operates a focus ring to rotate, a focus lens of an optical system is driven according to a direction of the operation and a rotation amount, and a focus position of the optical system moves. By this means, the user can manually adjust the focus of the imaging apparatus.

Unexamined Japanese Patent Publication No. 2013-21682 discloses a method of calculating a distance from an imaging apparatus to a subject by DFD (Depth From Defocus) processing.

SUMMARY OF THE INVENTION

The present disclosure provides an imaging apparatus which is effective to make it easier to manually adjust focus.

The imaging apparatus according to the present disclosure has: a display unit; an image capturing unit configured to capture a subject image which is formed on an imaging plane and to output image data; a distance information obtaining unit configured to obtain distance information of a single subject or each of a plurality of subjects in the image data; and a display controller configured to display on the display unit an image based on the image data. Further, the display controller is configured to associate a plurality of different colors respectively with a plurality of areas partitioned according to a distance from the imaging apparatus, to determine based on the distance information to which one of the plurality of areas the single subject or the each of the plurality of subjects corresponds, and to display on the display unit each captured subject with the color associated with the area corresponding to the each captured subject.

The imaging apparatus according to the present disclosure is effective to make it easier to manually adjust the focus.

BRIEF DESCRIPTION OF DRAWINGS

FIG. 4 is a flowchart illustrating a flow of processing upon an operation of capturing a still image in the digital camera according to the first exemplary embodiment;

DETAILED DESCRIPTION OF THE INVENTION

Hereinafter, exemplary embodiments are described in detail with reference to the drawings. However, unnecessarily detailed description may occasionally be omitted. For example, detailed description of well-known matters and redundant description of substantially the same configurations may occasionally be omitted. This is to avoid the following description from becoming unnecessarily redundant, and to ease understanding of those skilled in the art.

In addition, the accompanying drawings and the following description are provided to allow any person skilled in the art to fully understand the present disclosure, and not intend to limit the subject matter recited in the claims.

First Exemplary Embodiment

A first exemplary embodiment is described below with reference to FIGS. 1 to 5. Although digital camera 100 is described below as an example of an imaging apparatus, the imaging apparatus according to the present disclosure is by no means limited to digital camera 100, and the imaging apparatus only needs to have a manual focus function (a function of manually adjusting focus).

[1-1. Configuration]

Figure 1:
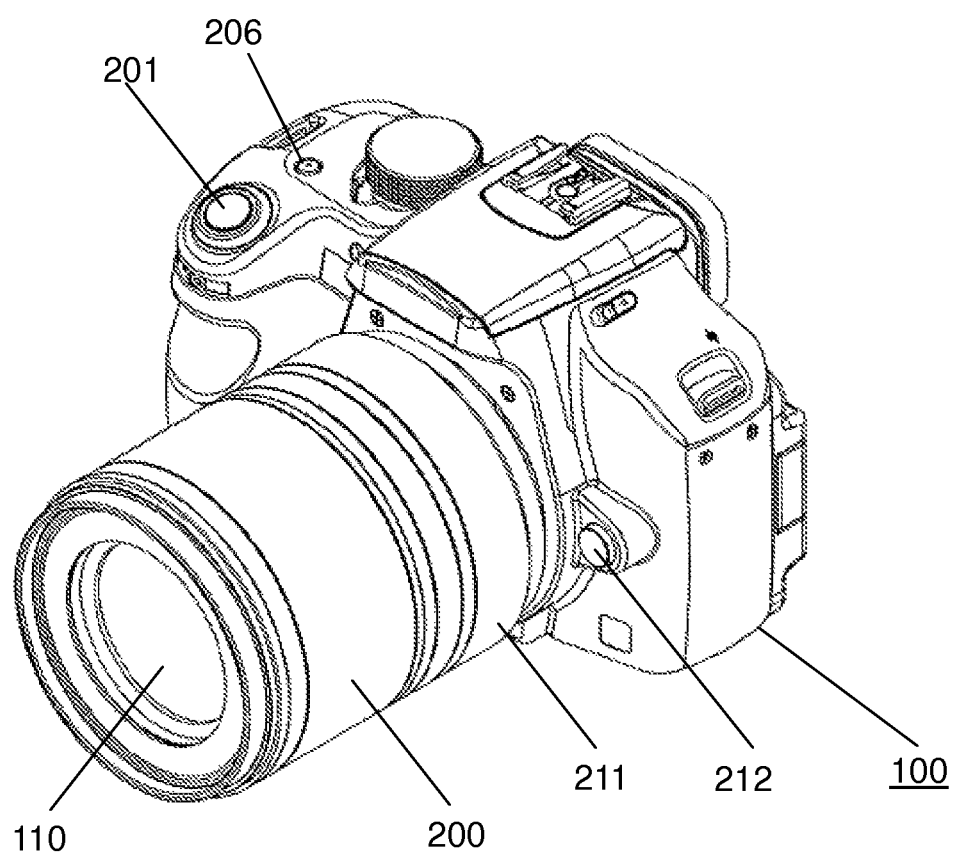
FIG. 1 is a perspective view of a digital camera according to a first exemplary embodiment when seen from a front side.
Figure 2:
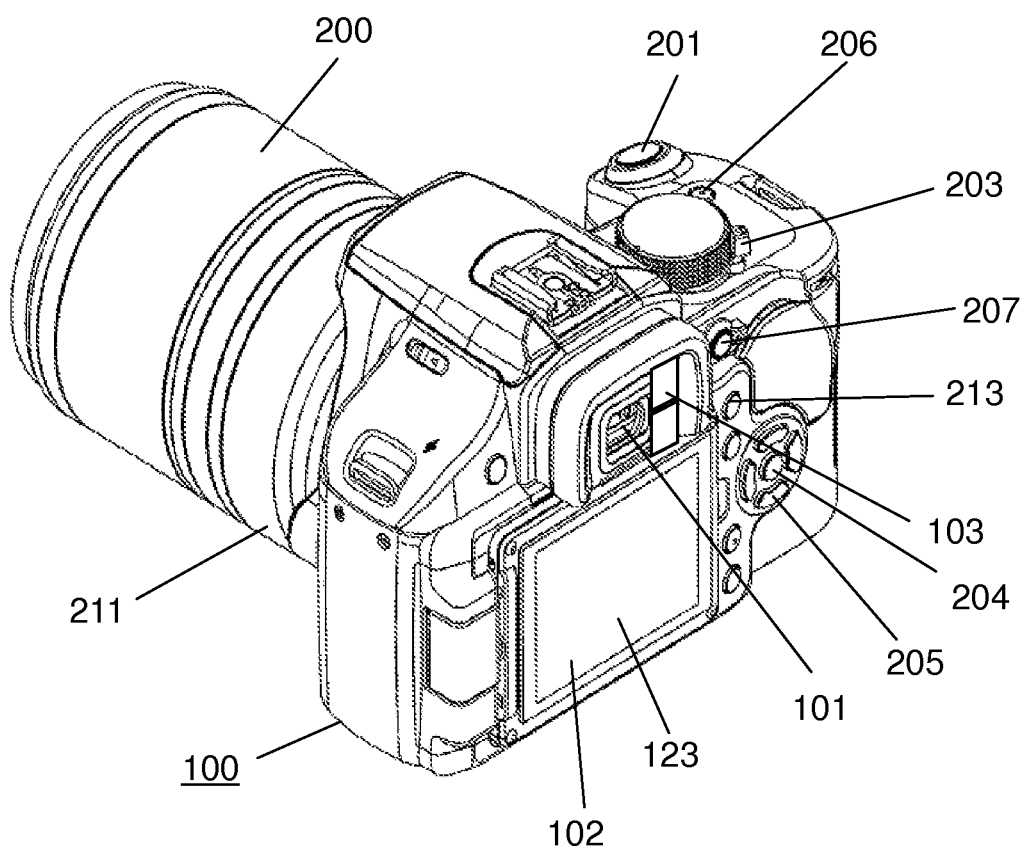
FIG. 2 is a perspective view of the digital camera according to the first exemplary embodiment when seen from a back side.

FIG. 1 is a perspective view of digital camera 100 according to the first exemplary embodiment when seen from a front side. FIG. 2 is a perspective view of digital camera 100 according to the first exemplary embodiment when seen from a back side.

Digital camera 100 has, at a front, lens barrel 200 in which optical system 110 is accommodated. Digital camera 100 has, in a top surface, operation buttons such as still image release button 201 and moving image release button 206, and power switch 203. Digital camera 100 has, in a back surface, liquid crystal monitor 123 on which touch panel 102 is mounted, view finder 101, eye approach detection sensor 103 and operation buttons. The operation buttons include center button 204, cross buttons 205, mode switch 207 and AF switch 213.

Further, digital camera 100 has a manual focus function, and has focus ring 211 which is a focus operation unit for manually adjusting the focus, in lens barrel 200. Focus ring 211 is configured to receive a manual operation for adjusting the focus. Lens barrel 200 is detachably attached to digital camera 100, and lens detachment button 212 is pressed to attach and detach lens barrel 200.

In addition, digital camera 100 may be configured to be integrally provided with lens barrel 200. In this case, lens detachment button 212 is not necessary.

Figure 3:
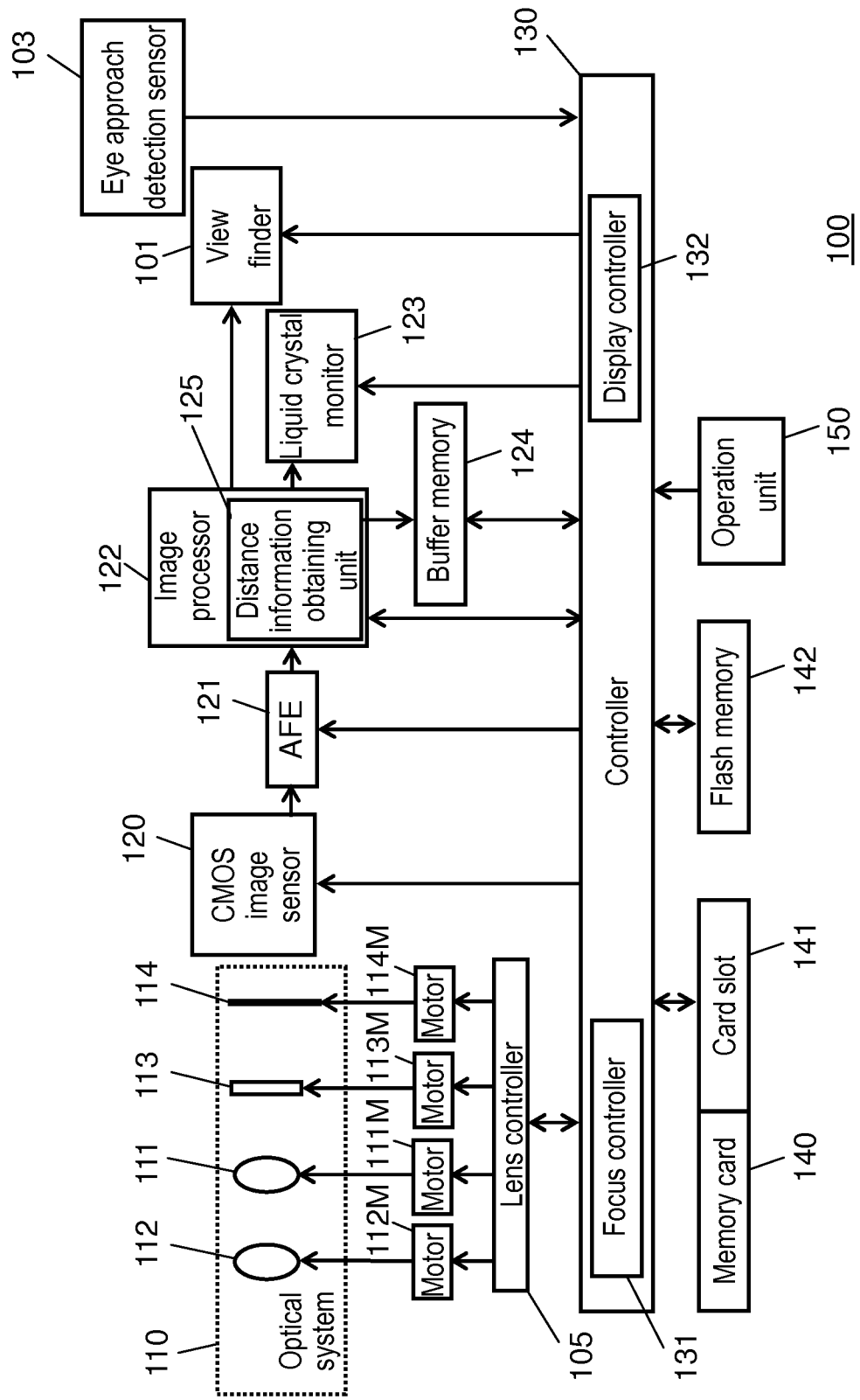
FIG. 3 is an electric configuration diagram of the digital camera according to the first exemplary embodiment.

FIG. 3 is an electric configuration diagram of digital camera 100 according to the first exemplary embodiment.

Digital camera 100 has controller 130 which integrally controls an entire operation of digital camera 100, operation unit 150 which is provided to an exterior of digital camera 100, flash memory 142, card slot 141, memory card 140 which is attached to card slot 141, lens controller 105, motors 111M to 114M, optical system 110 which is driven by motors 111M to 114M, CMOS image sensor 120 which is an image capturing unit, AFE (Analog Front End) 121, image processor 122, buffer memory 124, liquid crystal monitor 123 and view finder 101 which are a display unit, and eye approach detection sensor 103 as operation unit related to an electrical operation. Controller 130 has focus controller 131 and display controller 132.

In the present disclosure, a configuration where digital camera 100 has CMOS image sensor 120 as an example of an image capturing unit is described. However, the image capturing unit is by no means limited to CMOS image sensor 120, and may be, for example, a CCD image sensor.

Further, although a configuration where digital camera 100 has liquid crystal monitor 123 and view finder 101 as the display unit is described in the present disclosure, a configuration where digital camera 100 has one of liquid crystal monitor 123 and view finder 101 as the display unit may be employed. Alternatively, a configuration may be employed where an external monitor (not illustrated), which is connected to the digital camera 100 through a signal cable or wirelessly by means of electrical signals, is used as the display unit.

Digital camera 100 operates as schematically follows upon capturing of images. First, a subject image formed through optical system 110 is formed on an imaging plane of CMOS image sensor 120. CMOS image sensor 120 generates image data based on the subject image formed on the imaging plane, and outputs the image data. This is referred to as image capturing of a subject image by CMOS image sensor 120. Next, in AFE 121 and image processor 122, various types of processing are applied to image data generated by image capturing. Further, the processed image data is recorded in a recording medium such as flash memory 142 and memory card 140. In the present exemplary embodiment, a case where image data is recorded in memory card 140 is described as an example. The image data recorded in memory card 140 is displayed on liquid crystal monitor 123 or view finder 101 based on a user operation of operation unit 150.

Details of each unit are as follows.

Optical system 110 forms a subject image on the imaging plane of CMOS image sensor 120. Optical system 110 includes focus lens 111, zoom lens 112, diaphragm 113 and shutter 114. Optical system 110 may include an optical image stabilizer (OIS) lens (not illustrated). According to a configuration including the OIS lens, controller 130 drives the OIS lens to reduce a blur of a subject image formed on the imaging plane of CMOS image sensor 120 based on an output from a blur detector (not illustrated) such as an acceleration sensor. In addition, various lenses included in optical system 110 may include one or a plurality of lenses or include one or a plurality of groups.

Focus lens 111 is used to adjust the focus of the subject image formed on the imaging plane of CMOS image sensor 120. Zoom lens 112 is used to adjust an angle of view (image capturing range) of a subject. Diaphragm 113 is used to adjust the amount of light incident on CMOS image sensor 120. Shutter 114 is used to adjust an exposure time of light incident on CMOS image sensor 120.

Focus lens 111 is driven by motor 111M and moves in the optical axis direction of optical system 110. Zoom lens 112 is driven by motor 112M, diaphragm 113 is driven by motor 113M and shutter 114 is driven by motor 114M. Motors 111M to 114M are driven based on control signals from lens controller 105.

Lens controller 105 drives motors 111M to 114M based on an instruction from controller 130, and controls optical system 110. That is, focus controller 131 of controller 130 controls lens controller 105 to drive motor 111M. Hence, focus lens 111 is substantially driven by focus controller 131.

Lens controller 105 may be composed of a hard-wired electronic circuit or may be composed of, for example, a microcomputer which operates based on a program. Alternatively, lens controller 105 and controller 130 may be composed together of one semiconductor chip.

When digital camera 100 is in a state where digital camera 100 can capture a subject image (hereinafter referred to as a "shooting mode"), CMOS image sensor 120 generates image data of a new frame per fixed time. An image based on this image data is hereinafter referred to as a "through image". That is, the through image is a temporally continuous image based on new image data updated at a fixed cycle by CMOS image sensor 120.

AFE 121 applies, to the image data read from CMOS image sensor 120, noise suppression by correlated double sampling, amplification (amplification matching an input range of an A/D (Analog to Digital) converter) using an analog gain controller, and A/D conversion using an A/D converter. Subsequently, AFE 121 outputs the image data to image processor 122.

Image processor 122 applies various types of processing to the image data outputted from AFE 121. Further, image information subjected to the various types of processing is temporarily stored in buffer memory 124. The various types of processing includes, for example, smear correction, white balance correction, gamma correction, YC (Luminance/Chrominance) conversion processing, electronic zoom processing, compression processing, and extension processing.

These types of processing are image signal processing which is generally used, and are not described in details. Further, the present disclosure by no means limits various types of processing to these types of processing.

Further, upon processing of image data, image processor 122 obtains, for example, a brightness value for automatic exposure control and an RGB output value for white balance control, and notifies these pieces of information to controller 130.

Image processor 122 has distance information obtaining unit 125. Distance information obtaining unit 125 divides a captured image into a plurality of areas, and calculates a distance (a distance from digital camera 100) in each area by DFD (Data Flow Diagram) processing described below. The calculated distance is hereinafter referred to as "distance information". Image processor 122 associates the distance information calculated in each area with data indicating each area to notify the result to controller 130.

In addition, the present exemplary embodiment is by no means limited to this configuration, and may employ a configuration of notifying distance information to controller 130 by, for example, clarifying to which area this distance information corresponds in a generation order of the distance information.

The operation of calculating distance information per area can be regarded as substantially the same as obtaining distance information of a single subject or each of a plurality of subjects shown in a captured image. Hence, in the present exemplary embodiment, a description is given on the assumption that distance information obtaining unit 125 calculates distance information for each of subjects in image data. That is, the following description is based on the assumption that distance information obtaining unit 125 obtains distance information of each subject of a captured image and notifies the distance information to controller 130.

In addition, although image processor 122 may be configured to simply notify distance information of each area to controller 130, image processor 122 may be configured to determine each subject by signal processing of extracting an outline, and to associate data for determining a subject with distance information to notify the result to controller 130.

Image processor 122 may be composed of a hard-wired electronic circuit, or may be composed of, for example, a microcomputer which operates based on a program. Alternatively, image processor 122 and controller 130 may be composed together of one semiconductor chip.

Display controller 132 of controller 130 controls liquid crystal monitor 123 and view finder 101 which are the display unit based on the image data processed by image processor 122. Liquid crystal monitor 123 or view finder 101 displays, for example, an image based on the image data processed by image processor 122 or a menu screen. View finder 101 is an electronic view finder.

Images based on image data displayed on liquid crystal monitor 123 or view finder 101 include a recorded image and the above through image.

When digital camera 100 is in a shooting mode, image processor 122 generates a through image from image data generated by CMOS image sensor 120. Hence, display controller 132 displays an image based on a subject image formed on the imaging plane of CMOS image sensor 120 on liquid crystal monitor 123 or view finder 101 in substantially real time. That is, the user can capture a still image or shoot a moving image while checking, for example, a composition, an angle of view, and the focus of a subject by referring to the through image displayed on liquid crystal monitor 123 or view finder 101.

The recorded image is an image based on image data captured by digital camera 100 and recorded in memory card 140. Meanwhile, this image data includes a great number of pixels, and is not suitable to be displayed on liquid crystal monitor 123 or view finder 101. Hence, an image (an image whose number of pixels is reduced to a small number of pixels) obtained by reducing the number of pixels of recorded image data by image processor 122 is used to be displayed in a state (hereinafter referred to as a "playback mode") where a recorded image is checked on liquid crystal monitor 123 or view finder 101.

In addition, image data whose number of pixels recorded in memory card 140 is large is generated when image processor 122 processes image data generated by CMOS image sensor 120 immediately after a user operation is received by a release button (for example, immediately after a user presses still image release button 201).

Further, display controller 132 can generate a distance image based on the distance information calculated by distance information obtaining unit 125, and superimpose the distance image on the through image to display the superimposed image on the display unit. The through image on which the distance image is superimposed is an image which is displayed by color-coding each subject with a color based on the calculated distance information. This image is an image intended to allow the user to easily understand a distance from digital camera 100 to each subject by looking at the color of each subject displayed on the display unit.

Further, display controller 132 can further superimpose a guide image on the through image on which the distance image is superimposed to display the superimposed image on the display unit. The guide image is an image which indicates to the user a relationship between a plurality of colors used to display subjects and distances represented by the plurality of colors, a subject currently in focus (or a current focus position), and a relationship between an operation direction of focus ring 211 and a focus distance. The focus distance is a distance from digital camera 100 to a subject in focus. The guide image is an image intended to allow the user to easily understand how to operate focus ring 211 in order to bring another subject into focus by changing the focus distance.

The distance image and the guide image are described in details later.

Eye approach detection sensor 103 is arranged near view finder 101, detects that an object approaches view finder 101, and notifies the detection result to controller 130. Consequently, when the user moves the face closer to gaze into view finder 101 (this motion is hereinafter referred to as an "eye approach"), eye approach detection sensor 103 can detect the eye approach. Controller 130 controls view finder 101 and liquid crystal monitor 123 to display an image on view finder 101 when eye approach detection sensor 103 detects an eye approach, and display an image on liquid crystal monitor 123 when eye approach detection sensor 103 does not detect an eye approach.

Buffer memory 124 is a memory device which operates as a work memory of image processor 122 or controller 130 (a memory device which temporarily stores data to aid various types of processing). Buffer memory 124 can be realized by a semiconductor memory element such as a DRAM (Dynamic Random Access Memory).

Flash memory 142 is a non-volatile memory device which operates as an internal memory which stores image data, setting information of digital camera 100 and the like in a rewritable way.

Card slot 141 can be detachably connected with memory card 140, and enable memory card 140 to be electrically and mechanically connected with digital camera 100. Card slot 141 may have a function of controlling memory card 140, and may be configured to simply electrically connect controller 130 and memory card 140.

Memory card 140 is a memory device which has inside a non-volatile semiconductor memory element such as a flash memory. Memory card 140 stores, for example, image data processed by image processor 122 in a rewritable way.

Operation unit 150 collectively refers to operation buttons and operation dials provided on the exterior of digital camera 100, and receives user operations. For example, operation unit 150 includes, for example, still image release button 201, moving image release button 206, power switch 203, center button 204, cross buttons 205, mode switch 207, AF switch 213, touch panel 102, and focus ring 211 illustrated in FIGS. 1 and 2. When receiving a user operation, operation unit 150 notifies an operation instruction signal based on this operation to controller 130.

AF switch 213 receives a user operation of switching a focus control mode, and notifies the operation instruction signal based on this operation to controller 130. Controller 130 switches the focus control mode between an auto focus (AF) mode and a manual focus (MF) mode based on this operation instruction signal.

Still image release button 201 is a two-stage press button in a half-press state and a full-press state. When still image release button 201 is half-pressed by the user, controller 130 performs auto exposure (AE) control, performs AF control when focus control is the AF mode, and determines an image capturing condition upon image capturing of a still image. Subsequently, when still image release button 201 is full-pressed by the user, controller 130 performs still image capturing processing. Controller 130 stores image data captured at timing at which still image release button 201 is full-pressed, in memory card 140 and the like as image data of a still image. In addition, AF control is not performed when focus control is the MF mode.

Moving image release button 206 is a press button for instructing start or finish of a moving image shooting. When moving image release button 206 is pressed by the user, a moving image shooting starts, and controller 130 sequentially stores, as image data of the moving image, image data continuously generated by image processor 122 based on image data continuously generated by CMOS image sensor 120 in memory card 140. When the user presses moving image release button 206 again, moving image shooting is finished.

Power switch 203 is a switch which allows the user to instruct digital camera 100 to power on and off. When power switch 203 is operated to the power on side by the user during a power off state of digital camera 100, controller 130 supplies power to each unit included in digital camera 100 and digital camera 100 is placed in a power on state. Further, when power switch 203 is operated to the power off side by the user during the power on state of digital camera 100, controller 130 stops supplying power to each unit and digital camera 100 is placed in a power off state.

Center button 204 is a press button. When digital camera 100 is in a shooting mode or a playback mode, and center button 204 is pressed by the user, controller 130 displays a menu screen on liquid crystal monitor 123. The menu screen is a screen for setting various conditions upon shooting or upon playback. The various conditions set on the menu screen are stored in flash memory 142. Center button 204 also functions as an enter button, and the user can determine a selection item by selecting a setting item of various conditions using, for example, cross buttons 205 and pressing center button 204.

Cross buttons 205 are press buttons provided near the above, the below, the left and the right of the center button 204, and can be pressed by selecting one of four directions, i.e. upper, lower, left and right directions. The user can select a setting item of various conditions on the menu screen displayed on liquid crystal monitor 123 by pressing one of cross buttons 205.

Mode switch 207 is a press button which allows one of two directions, i.e. upper and lower directions to be selected and pressed. The user can switch digital camera 100 from the shooting mode to the playback mode or vice versa by selecting one of the two directions and pressing mode switch 207.

Touch panel 102 is provided on a display surface of liquid crystal monitor 123. When the user touches touch panel 102, touch panel 102 detects a touched position and outputs a signal indicating the position to controller 130. Controller 130 performs control based on this signal. The following operation is an example of the operation based on this control. When a still image is captured by setting digital camera 100 to the AF mode and the user touches an arbitrary spot on the through image displayed on liquid crystal monitor 123, touch panel 102 detects this position and notifies the detected position to controller 130. Controller 130 performs AF control on a subject displayed at this position.

Focus ring 211 is rotatably provided around lens barrel 200 and in a rotation direction about the optical axis of optical system 110 provided to lens barrel 200. When a still image is captured by setting digital camera 100 to the MF mode and the user rotates focus ring 211, a signal corresponding to a rotation direction and a rotation amount is notified to controller 130 and focus controller 131 controls lens controller 105 according to this signal. Lens controller 105 drives motor 111M based on this control, and moves focus lens 111 in the optical direction of optical system 110. That is, when digital camera 100 is in the MF mode, focus lens 111 is driven based on a user manual operation of focus ring 211.

A position of focus lens 111 (a position in lens barrel 200) is hereinafter referred to as a "focus position". Focus lens 111 is driven by focus controller 131 through lens controller 105, so that focus controller 131 can learn and obtain the current focus position.

When focus lens 111 moves in the optical axis direction, a focus state of a subject image formed on the imaging plane of CMOS image sensor 120 changes. That is, a distance (focus distance) from digital camera 100 (or the imaging plane of CMOS image sensor 120) to a subject in focus (brought into focus) on the imaging plane changes according to a focus position. Thus, it is possible to associate the focus position with the focus distance. Further, focus controller 131 includes information in which the focus position and the focus distance are associated, and can obtain a current focus distance from a current focus position. That is, the focus position substantially represents a focus distance.

Hence, in the present exemplary embodiment, the focus position refers to a distance (focus distance) from the imaging plane of CMOS image sensor 120 to a subject in focus (brought into focus) on the imaging plane.

In addition, controller 130 may be composed of a hard-wired electronic circuit, or may be composed of, for example, a microcomputer. Alternatively, controller 130 and image processor 122 may be composed together of one semiconductor chip. Further, a ROM in which data which is necessary to operate controller 130 is written may be provided inside controller 130 or may be provided outside controller 130.

In addition, in the present exemplary embodiment, although an example has been described where image processor 122 has distance information obtaining unit 125 and controller 130 has focus controller 131 and display controller 132, a configuration may be employed where distance information obtaining unit 125, focus controller 131, and display controller 132 are individually provided. Further, image processor 122 and controller 130 may be configured such that image processor 122 operates as distance information obtaining unit 125 and performs other operations, and controller 130 operates as focus controller 131 and display controller 132 and perform other operations.

[1-2. Operation]

An operation of digital camera 100 configured as described above is described below.

In addition, the present disclosure relates to focus adjustment mainly when focus control is the MF mode, and therefore the operation of digital camera 100 upon image capturing of a still image in a case where focus control is the MF mode is described and an operation in a case where focus control is the AF mode and an operation of displaying a recorded image or the menu screen on the display unit are not described. However, each operation described in the present exemplary embodiment is by no means limited only to the MF mode. For example, part or all of operations described in the present exemplary embodiment may be performed in the AF mode or may be performed upon shooting of a moving image.

[1-2-1. Basic Operation Upon Capturing of Still Image in MF Model]

FIG. 4 is a flowchart illustrating a flow of processing upon an operation of capturing a still image in digital camera 100 according to the first exemplary embodiment.

When mode switch 207 receives a user operation and digital camera 100 is set to the shooting mode, controller 130 first performs initialization processing which is necessary to record image data of a still image, on each unit (S401).

Next, controller 130 performs a series of processing such as processing of checking a user operation received by operation unit 150 and processing of displaying an image on the display unit. Further, a series of processing is repeated at a predetermined cycle. A series of processing includes checking a state of mode switch 207 (S402), displaying a through image on the display unit (S403), calculating distance information (S404), color-coding and displaying a display image based on the distance information (S405), displaying a guide image on the display unit (S406), determining an operation of a focus ring (S407), and monitoring whether or not still image release button 201 is full-pressed (S410).

In step S402, it is checked that whether or not a state of mode switch 207 changes from the shooting mode. When it is checked that the state of mode switch 207 changes from the shooting mode to a non-shooting mode state (No), a series of processing in the shooting mode is finished. When the state of mode switch 207 is still the shooting mode (Yes), a series of processing is continued.

In step S403, CMOS image sensor 120 performs an image capturing operation, and outputs image data. Image processor 122 processes this image data, and generates a through image. Controller 130 displays the generated through image on liquid crystal monitor 123 or view finder 101. Controller 130 displays the through image on view finder 101 when eye approach detection sensor 103 detects an eye approach or displays the through image on liquid crystal monitor 123 when eye approach detection sensor 103 does not detect the eye approach. In addition, controller 130 may display the through image both on liquid crystal monitor 123 and view finder 101. An operation example of displaying a through image on liquid crystal monitor 123 is described below.

In step S404, distance information obtaining unit 125 of image processor 122 calculates distance information by DFD processing from two items of image data captured in step S403.

The two items of image data are image data obtained by the image capturing operation in step S403 when positions of focus lens 111 are different in a series of processing repeated at a predetermined cycle. That is, these two items of image data are image data whose focus distances are different from each other. Consequently, when these two items of image data are compared, blur amounts at the same positions are different from each other. This is because the two items of image data are used for DFD processing. Even when focus control is the MF mode, focus controller 131 temporarily moves focus lens 111, and digital camera 100 according to the present exemplary embodiment performs an operation of capturing two images whose focus distances are different to obtain these two items of image data. In addition, these two items of image data may be image data obtained by two successive image capturing operations.

The DFD processing is processing of calculating a blur correlation amount between a plurality of items of captured image data in a state where positions of focus lens 111 are different from each other (the focus distances are different from each other), and of generating information of a distance from the image capturing device to a subject. In addition, as described above, a method of generating distance information by the DFD processing is known, and therefore is not described in detail.

In step S405, display controller 132 of controller 130 generates a distance image based on the distance information calculated in step S404, superimposes the generated distance image on a through image, and displays the through image on the display unit (e.g., liquid crystal monitor 123). In this regard, the image displayed on the display unit is not an image of a captured color, and is an image in which each subject is color-coded with a color based on distance information.

Figure 5A:
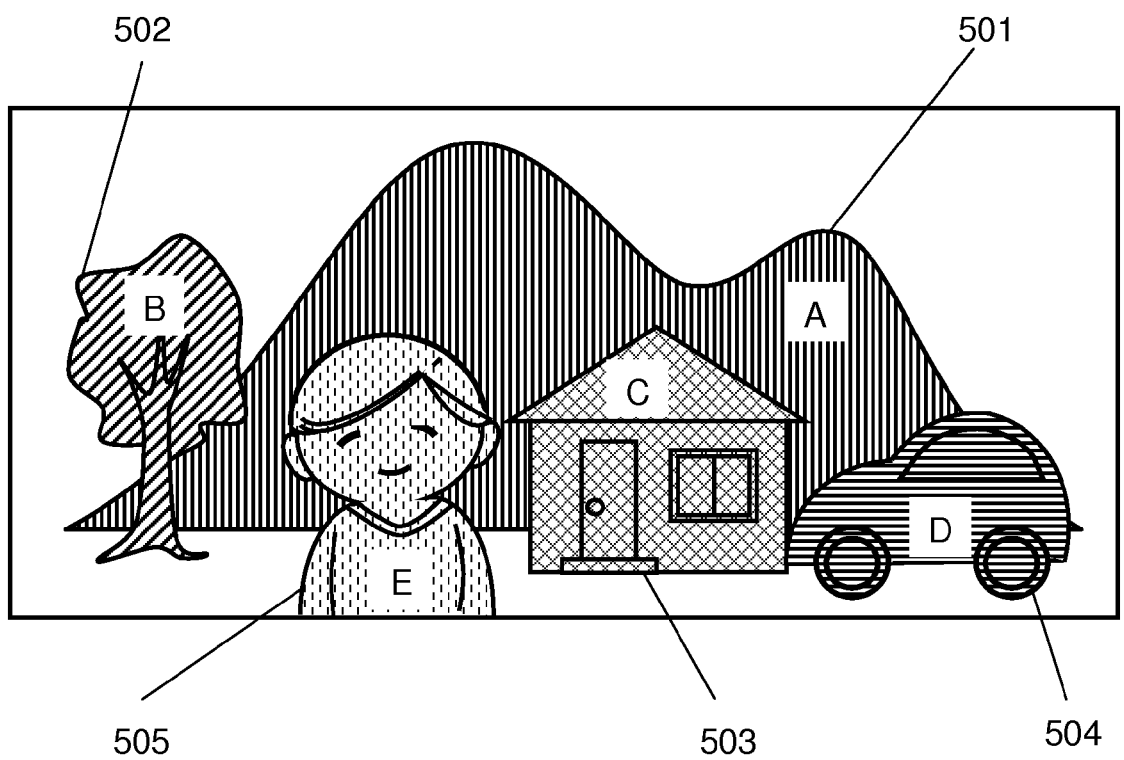
FIG. 5A illustrates an example of a through image on which a distance image displayed on a display unit of the digital camera according to the first exemplary embodiment is superimposed.

An example of a through image on which a distance image is superimposed is described with reference to FIG. 5A. FIG. 5A illustrates an example of the through image on which the distance image displayed on the display unit of digital camera 100 according to the first exemplary embodiment is superimposed.

In the example illustrated in FIG. 5A, five subjects of mountain 501, timber 502, house 503, car 504, and person 505 are captured in one image.

In addition, although symbols A to E are described in FIG. 5A and the subsequent drawings illustrating images displayed on the display unit, these symbols represent colors of these symbols for the sake of convenience, and these symbols are not displayed on an actual display image.

In the present exemplary embodiment, a plurality of areas are first set according to the distance from digital camera 100. An example where five areas are set is described in the present exemplary embodiment. The five areas includes an area whose distance from digital camera 100 is less than 2 m, an area whose distance is 2 m or more and less than 5 m, an area whose distance is 5 m or more and less than 15 m, an area whose distance is 15 m or more and less than 30 m, and an area whose distance is 30 m or more.

Further a plurality of colors different from each other are associated with the respective areas. In the present exemplary embodiment, an example is described where color A (e.g., purple) is associated with the area whose distance is 30 m or more, color B (e.g., blue) is associated with the area whose distance is 15 m or more and less than 30 m, color C (e.g., green) is associated with the area whose distance is 5 m or more and less than 15 m, color D (e.g., yellow) is associated with the area whose distance is 2 m or more and less than 5 m and color E (e.g., red) is associated with the area whose distance is less than 2 m.

In addition, although these settings are simple examples, the present exemplary embodiment is not limited to these settings.

Next, to which area each subject corresponds is determined based on the distance information calculated in step S404. In the present exemplary embodiment, an example is described where it is determined that mountain 501 corresponds to the area whose distance is 30 m or more, timber 502 corresponds to the area whose distance is 15 m or more and less than 30 m, house 503 corresponds to the area whose distance is 5 m or more and less than 15 m, car 504 corresponds to the area whose distance is 2 m or more and less than 5 m, and person 505 corresponds to the area whose distance is less than 2 m.

Display controller 132 generates a distance image for color-coding each subject based on this determination. This distance image is an image for color-cording and displaying each subject based on the above setting and the determination result. In the example described in the present exemplary embodiment, mountain 501 is color-coded by color A (e.g., purple), timber 502 is color-coded by color B (e.g., blue), house 503 is color-coded by color C (e.g., green), car 504 is color-coded by color D (e.g., yellow), and person 505 is color-coded by color E (e.g., red) to display. Hence, by superimposing this distance image on the through image, as illustrated in FIG. 5A, an image in which mountain 501 is color-coded by color A, timber 502 is color-coded by color B, house 503 is color-coded by color C, car 504 is color-coded by color D, and person 505 is color-coded by color E is displayed on the display unit.

Thus, by displaying on the display unit the through image in which each subject is color-coded by the color based on distance information, the user can easily understand to which area each subject belongs, that is, how long the distance from digital camera 100 to each subject is.

In addition, processing of, for example, applying no color to a subject, displaying a subject using a color as is upon image capturing, or color-coding a subject with other colors which are not used for association is applied to a subject such as the sky or the ground which is flat and whose calculation of distance information by DFD processing is difficult. FIG. 5A and subsequent drawings illustrate examples where these subjects are not colored.

Next, in step S406, display controller 132 of controller 130 generates guide image 510, superimposes guide image 510 on a through image in which each subject is color-coded based on distance information, and displays the through image on the display unit (e.g., liquid crystal monitor 123).

Guide image 510 is an image which visually shows a relationship between a plurality of colors used to display each subject and distances represented by the plurality of colors, a subject currently in focus, and a relationship between an operation direction and a focus distance of focus ring 211. And guide image 510 is an image intended to allow the user to easily understand how to operate focus ring 211 in order to change the focus distance and bring another subject into focus.

Figure 5B:
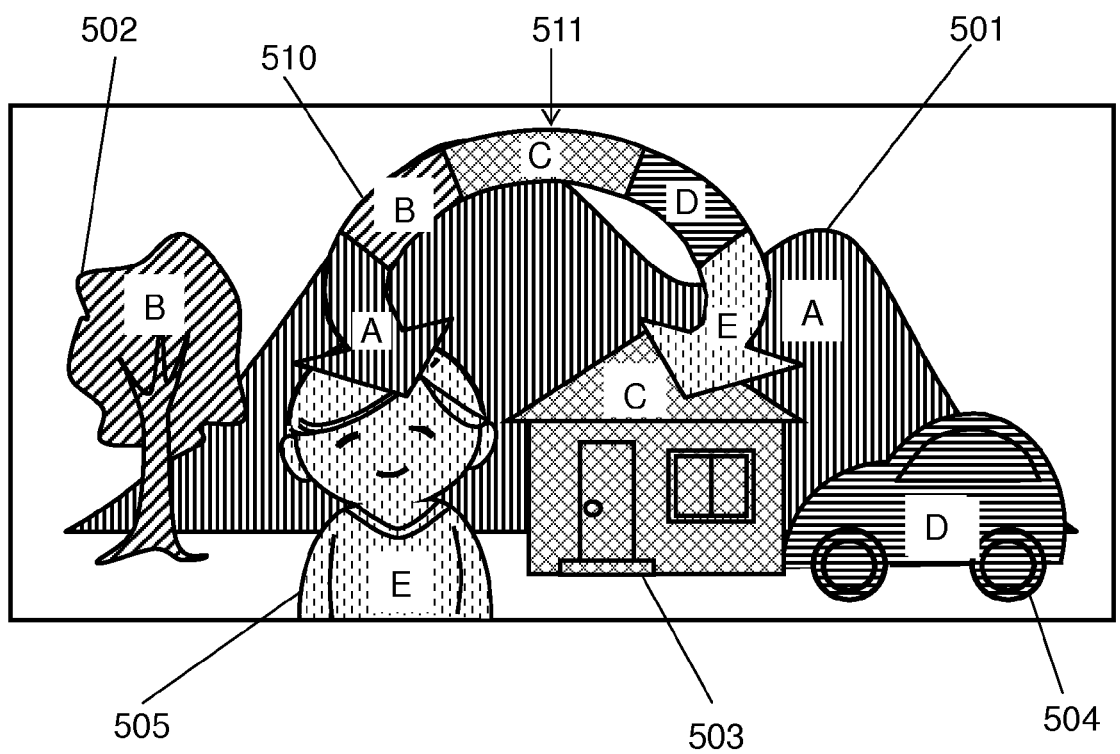
FIG. 5B illustrates an example of a through image on which a guide image displayed on the display unit of the digital camera according to the first exemplary embodiment is superimposed.

An example of an image on which guide image 510 is superimposed is described with reference to FIG. 5B. FIG. 5B illustrates an example of a through image on which guide image 510 displayed on the display unit of digital camera 100 according to the first exemplary embodiment is superimposed.

As illustrated in FIG. 5B, guide image 510 has a downward opening arc shape provided with arrows at both front ends. These arrows indicate a manual operation direction (a manual rotation direction) of focus ring 211 provided to lens barrel 200. Further, guide image 510 is color-coded by a plurality of colors associated with respective areas set according to distances from digital camera 100. In the example illustrated in FIG. 5B, guide image 510 is color-coded by five colors of color A (e.g., purple), color B (e.g., blue), color C (e.g., green), color D (e.g., yellow), and color E (e.g., red). These colors are arranged on guide image 510 as follows.

For example, digital camera 100 is configured to, when focus control is the MF mode, change a focus position to a long-distance view side when focus ring 211 is operated to rotate in a counterclockwise direction, and change a focus position to a short-distance view side when focus ring 211 is operated to rotate in a clockwise direction.

In this regard, display controller 132 arranges each color in guide image 510 as follows.

A color (e.g., the color A) associated with an area in a longest-distance view (e.g., an area whose distance from digital camera 100 is 30 m or more) is arranged in an arrow portion indicating the counterclockwise direction. A color (e.g., the color E) associated with an area in a shortest distance view (e.g., the area whose distance from digital camera 100 is less than 2 m) is arranged in an arrow portion indicating the clockwise direction. A color associated with an area to which the current focus position corresponds is arranged in center 511 of guide image 510. FIG. 5B illustrates an example where the current focus position corresponds to an area whose distance is 5 m or more and less than 15 m and color C associated with this area is arranged in center 511 of guide image 510.

Further, the rest of colors are arranged on guide image 510 according to distances represented by the area associated with the colors. In an example illustrated in FIG. 5B, color B is arranged between color A and color C. Color B is associated with an area which is closer than the area associated with color A, which is farther than the area associated with color C, and whose distance is 15 m or more and less than 30 m. Color D is arranged between color C and color E. Color D is associated with an area which is closer than the area associated with color C, which is farther than the area associated with color E, and whose distance is 2 m or more and less than 5 m. Hence, in the example illustrated in FIG. 5B, colors A to E are arranged on guide image 510 in order of the distance indicated by each color which changes to the short-distance side clockwise.

In addition, contrary to the above example, when digital camera 100 is configured such that a focus position moves to a short-distance view side when focus ring 211 is operated to rotate in the counterclockwise direction, each color is arranged on guide image 510 in order reverse to the order in the example illustrated in FIG. 5B.

In addition, information in which an operation direction and an operation amount of a manual operation of focus ring 211 and a moving direction and a movement amount of a focus position are associated with each other may be configured to be provided in advance in a main body (e.g., controller 130 or focus controller 131) of digital camera 100, or, alternatively, a configuration may be employed where communication is performed between lens barrel 200 and digital camera 100 (e.g., controller 130) to exchange information related to a manual operation of focus ring 211 and a control signal related to driving of focus lens 111 to each other.

Thus, guide image 510 is superimposed on the color-coded through image (e.g., the image illustrated in FIG. 5A) and is displayed on the display unit, so that the user can easily understand a subject currently in focus and in which rotation direction to manually rotate focus ring 211 in order to change a subject to be brought into focus.

In the example illustrated in FIG. 5B, the user can easily understand that 1) the subject currently in focus is house 503 displayed with color C arranged in center 511 of guide image 510, 2) car 504 displayed with color D is in a shorter distance view than house 503 displayed with color C, 3) person 505 displayed with color E is in a much shorter distance view, 4) timber 502 displayed with color B is in a longer distance view than house 503 displayed with color C, and 5) mountain 501 displayed with color A is in a much longer distance view. Further, the user can easily understand that 6) it is necessary to operate focus ring 211 to rotate in an arrow direction in which color E is arranged, that is, clockwise in order to bring into focus car 504 in a shorter distance view than house 503 or person 505 in a much shorter distance view, and 7) it is necessary to operate focus ring 211 to rotate in an arrow direction in which color A is arranged, that is, counterclockwise in order to bring into focus timber 502 in a longer distance view than house 503 or mountain 501 in a much longer distance view.

Next, in step S407, a signal corresponding to a rotation direction and a rotation amount of a manual operation is notified to controller 130 from focus ring 211 which is manually operated by the user. Controller 130 determines based on this signal whether or not focus ring 211 is manually operated. When controller 130 determines that focus ring 211 is manually operated (Yes), focus controller 131 of controller 130 controls lens controller 105 according to this signal. Lens controller 105 drives focus lens 111 based on this control. By this means, focus lens 111 is moved according to an operation direction and a rotation amount of a manual rotation operation of focus ring 211 (S408).

When controller 130 determines that focus ring 211 is not manually operated (No), focus controller 131 does not drive focus lens 111.

In step S410, a signal corresponding to the manual operation is notified to controller 130 from still image release button 201 manually operated by the user. Controller 130 determines based on this signal whether still image release button 201 is full-pressed. When controller 130 determines that still image release button 201 is not full-pressed (No), the flow returns to step S402 to repeat the above series of processing. When controller 130 determines that still image release button 201 is full-pressed (Yes), controller 130 performs the above still image capturing processing (S411) and then the flow returns to step S402 to repeat the above series of processing.

[1-2-2. Operation Upon Manual Operation of Focus Ring 211]

An operation of focus ring 211 manually operated by the user is described with reference to FIG. 4 again.

When a user manual operation of focus ring 211 is detected in step S407, focus lens 111 moves according to this manual operation in step S408.

The same operations as the above are performed in steps S410, S411, S402, S403, S404 and S405 and are not described.

In step S406, display controller 132 of controller 130 generates guide image 510' matching a position of moved focus lens 111, superimposes guide image 510' on a through image (illustrated in, for example, FIG. 5A) in which each subject is color-coded based on distance information, and displays the through image and guide image 510' on the display unit (e.g., liquid crystal monitor 123).

Figure 5C:
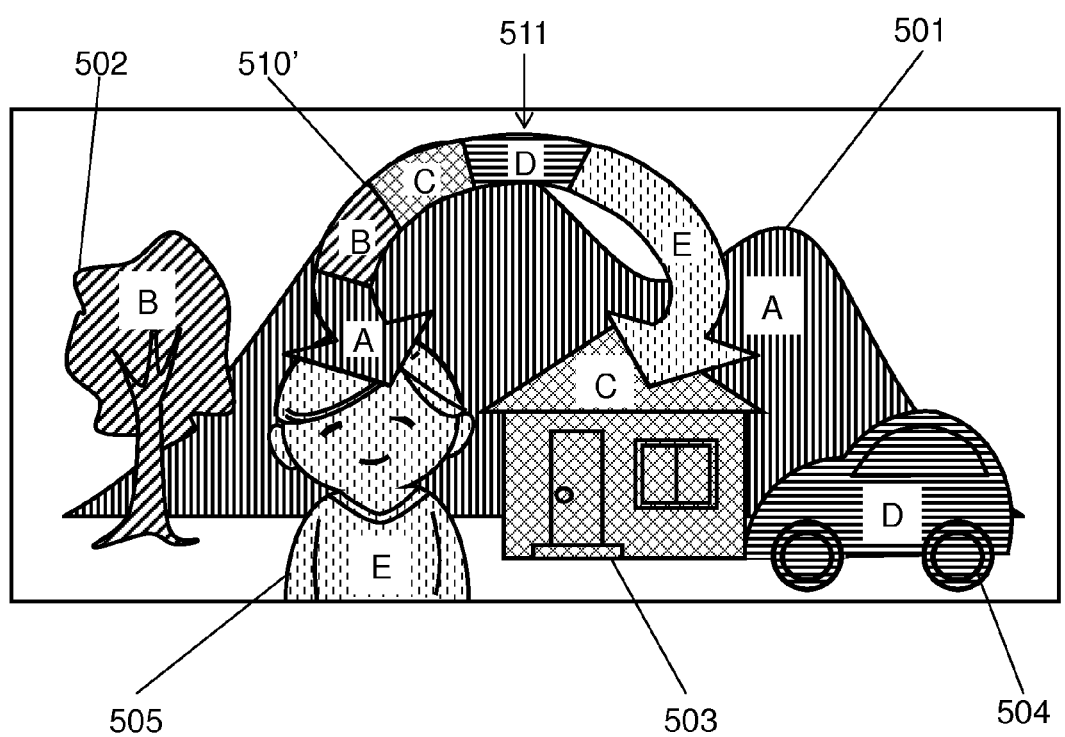
FIG. 5C illustrates another example of a through image on which a guide image displayed on the display unit of the digital camera according to the first exemplary embodiment is superimposed.

An example of an image on which guide image 510' is superimposed is described with reference to FIG. 5C. FIG. 5C illustrates an example of a through image on which guide image 510' displayed on the display unit of digital camera 100 according to the first exemplary embodiment is superimposed.

Guide image 510' employs the same basic configuration as that of guide image 510 illustrated in FIG. 5B, and therefore redundant description thereof is not described. In the present exemplary embodiment, when an area to which a focus position belongs changes following movement of focus lens 111, a color to be arranged in center 511 is changed according to this change. Further, arrangement positions of other colors are also changed according to this change. However, an order of an arrangement of each color is not changed.

FIG. 5C illustrates an example where the focus position is changed to car 504 which belongs to an area whose distance is 2 m or more and less than 5 m following movement of focus lens 111. In this case, the color to be arranged in center 511 is changed from color C to color D associated with this area. Further, the arrangement position of each color is changed according to this change. Meanwhile, the arrangement order of each color is not changed, and the arrangement order of color A to color E is the same as that of guide image 510 illustrated in FIG. 5B. Thus, guide image 510' indicates that the current focus position changes to the area to which car 504 belongs and which is displayed with color D.

Thus, when the focus position changes, the color arranged in center 511 changes according to this change, so that the user can easily understand the subject in focus when focus ring 211 is manually operated.

In addition, digital camera 100 may be configured to arbitrarily switch from a mode of displaying a through image displayed on the display unit, using a captured color as is, to a mode of color-coding and displaying each subject based on distance information, and vice versa, according to a user operation of operation unit 150. Further, digital camera 100 may be configured to allow the user to arbitrarily switch from a mode of displaying a guide image to a mode of not displaying a guide image, and vice versa. Only a through image (e.g., the image illustrated in FIG. 5A) in which each subject is color-coded based on distance information may be displayed in the mode of not displaying a guide image.

[1-3. Effect]

As described above, in the present exemplary embodiment, digital camera 100 which is the imaging apparatus has liquid crystal monitor 123 which is the display unit, CMOS image sensor 120 which is the image capturing unit, distance information obtaining unit 125, and display controller 132.

CMOS image sensor 120 is configured to capture a subject image formed on the imaging plane and to output image data.

Distance information obtaining unit 125 is configured to obtain distance information of a single subject or each of a plurality of subjects in image data.

Display controller 132 is configured to display an image based on the image data, on the display unit. Further, there is employed a configuration of associating a plurality of different colors with a plurality of areas partitioned according to distances from digital camera 100, determining based on distance information to which one of a plurality of areas each subject corresponds, and displaying on the display unit each captured subject with the color associated with a corresponding area.

By this means, when the user looks at a color of each subject displayed on the display unit, the user can easily understand the distance from digital camera 100 to each subject.

Further, digital camera 100 which is the imaging apparatus has focus lens 111 for focus adjustment, focus ring 211 which is the focus operation unit, and focus controller 131.

Focus ring 211 is configured to receive a manual operation for focus adjustment.

Focus controller 131 is configured to drive focus lens 111 in the optical axis direction according to the manual operation, and obtain the position of focus lens 111 as a focus position and obtain a distance from digital camera 100 to a subject in focus on the imaging plane, based on the focus position.

Further, the display controller 132 is configured to display guide image 510 which indicates an operation direction of a manual operation, on the display unit, and to indicate the current focus position and a relationship between an operation direction of the manual operation and a focus position which is changed by an operation direction in guide image 510.

Guide image 510 has a shape which indicates, for example, the operation direction of the manual operation of focus ring 211, and is color-coded by a plurality of colors respectively associated with a plurality of areas set according to the distance from digital camera 100. Further, in guide image 510, a color associated with an area in the shortest-distance view is arranged in a portion indicating the operation direction in which the focus position moves to a short-distance view side, a color associated with an area in the longest-distance view is arranged in a portion indicating the operation direction in which the focus position moves to a long-distance view side, and the rest of colors are arranged therebetween in order matching the distance indicated by each area. A color associated with the area corresponding to the current focus position is arranged in center 511.

Consequently, the user can easily understand a subject currently in focus. Further, when a subject to be brought into focus is changed, the user can easily understand whether this subject is in a short-distance view or a long-distance view with respect to a subject currently in focus. Furthermore, when a subject to be brought into focus is changed, the user can easily understand in which direction to manually operate focus ring 211.

That is, the method disclosed in the present exemplary embodiment is effective to make it easier for the user to manually adjust the focus of the imaging apparatus.

Other Exemplary Embodiments

As described above, the first exemplary embodiment has been described as an example of the technology disclosed in this application. However, the technology according to the present disclosure is not limited to this, and is also applicable to exemplary embodiments to which changes, substitutions, addition, and omission are applied. Further, a new exemplary embodiment can also be made by combining respective components described in the first exemplary embodiment.

Other exemplary embodiments are described below.

In the first exemplary embodiment, although an example has been described where a color arranged in center 511 of a guide image and an arrangement position of each color are set according to a current focus position, display controller 132 may be configured to indicate a current focus position, for example, by superimposing a mark indicating a current focus position, on a guide image. This example is described with reference to FIG. 6.

Figure 6:
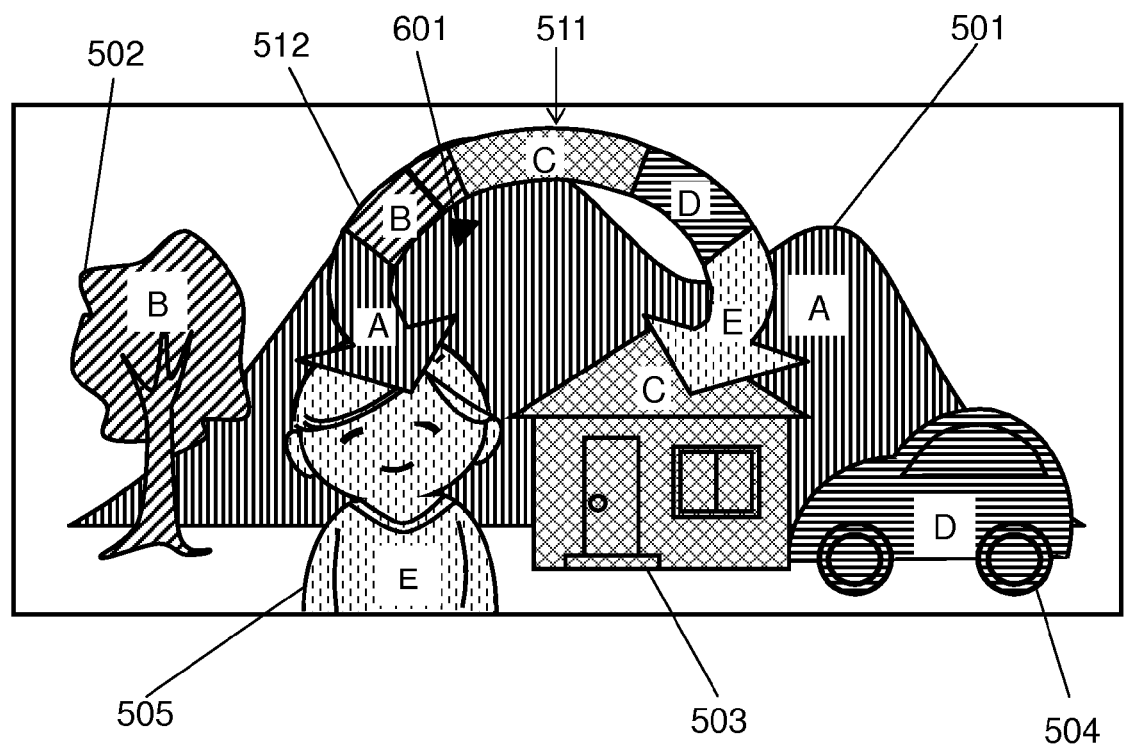
FIG. 6 illustrates an example of a through image on which a guide image displayed on a display unit of a digital camera according to another exemplary embodiment is superimposed.

FIG. 6 is a view illustrating an example of a through image on which guide image 512 displayed on a display unit of digital camera 100 according to another exemplary embodiment is superimposed.

Guide image 512 illustrated in FIG. 6 employs the same basic configuration as that of guide image 510 illustrated in FIG. 5B, and redundant description thereof is not described. Meanwhile, an arrangement position of each color in guide image 512 does not change depending on a current focus position. Mark 601 is superimposed on guide image 512, and this mark 601 indicates the current focus position.

FIG. 6 illustrates an example in a case where timber 502 is in focus. Hence, in FIG. 6, color B which is the same color as a color for displaying timber 502 is indicated by mark 601. Further, when a focus position changes following movement of focus lens 111, in guide image 512 illustrated in FIG. 6, the position of mark 601 changes according to this change. Even this configuration allows the user to easily understand a subject currently in focus. Further, that the user can easily understand how to manually operate focus ring 211 to change a subject to be brought into focus is the same as that of the first exemplary embodiment.

Alternatively, display controller 132 may be configured to change a color for displaying each subject according to a current focus position instead of changing a color arranged in center 511 of a guide image and an arrangement position of each color according to a current focus position. This example is described with reference to FIG. 7.

Figure 7:
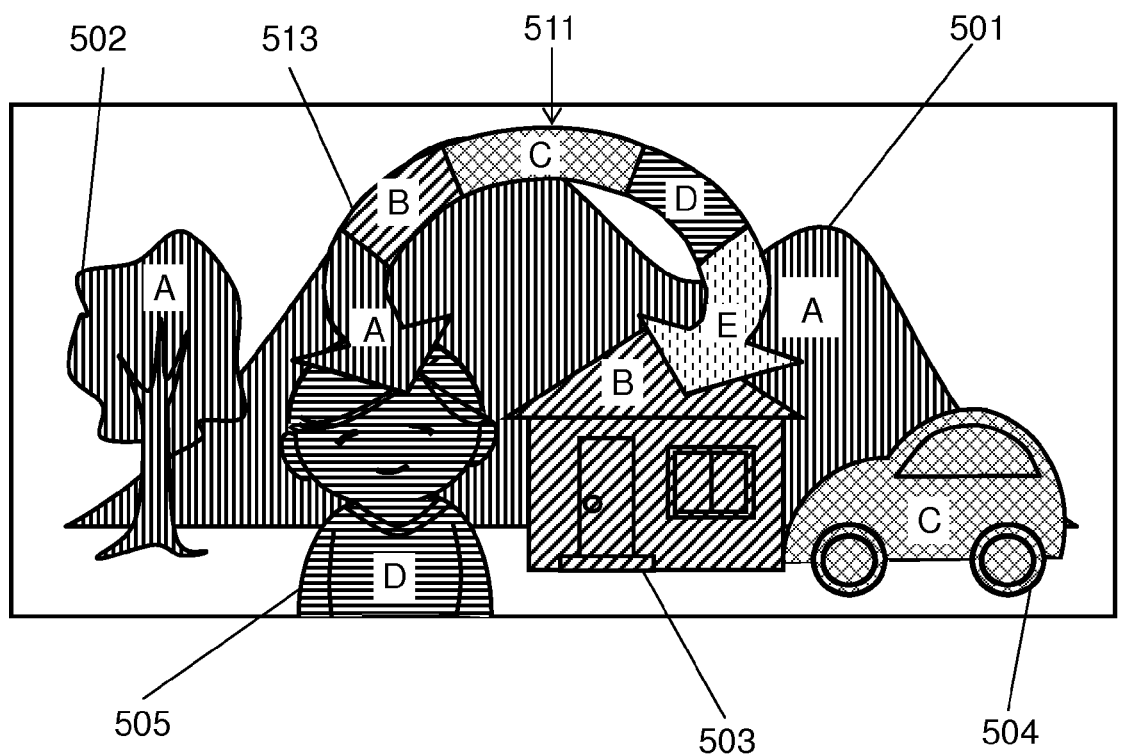
FIG. 7 illustrates another example of a through image on which a guide image displayed on a display unit of a digital camera according to still another exemplary embodiment is superimposed.

FIG. 7 illustrates an example of a through image on which guide image 513 displayed on a display unit of digital camera 100 according to still another exemplary embodiment is superimposed.

Guide image 513 illustrated in FIG. 7 employs the same basic configuration as that of guide image 510 illustrated in FIG. 5B, and therefore redundant description thereof is not described. Meanwhile, an arrangement position of each color in guide image 513 does not change according to a current focus position. That a color arranged in center 511 of guide image 513 is a color associated with the area to which the current focus position corresponds is the same as that in the first exemplary embodiment. Meanwhile, a color for displaying each subject is changed according to the current focus position in the example illustrated in FIG. 7.

When, for example, the focus position changes from house 503 to car 504, the image to be displayed on the display unit changes from the image illustrated in FIG. 5B to the image illustrated in FIG. 7. That is, a color for displaying car 504 is changed from color D to color C arranged in center 511 of guide image 513. This change in the color corresponds to one counterclockwise shift in a color combination of guide image 513. Hence, a color for displaying another subject is changed according to this change. That is, a color for displaying timber 502 is changed from color B to color A, a color for displaying house 503 is changed from color C to color B and a color for displaying person 505 is changed from color E to color D. In addition, mountain 501 is already displayed with color A which represents the longest-distance view, and therefore the color is not changed.

Further, although not illustrated, when the focus position changes from house 503 to person 505, the color for displaying person 505 is changed from color E to color C, the color for displaying timber 502 is changed from color B to color A, the color for displaying house 503 is changed from color C to color A, and the color for displaying car 504 is changed from color D to color B.

Alternatively, although not illustrated, when the focus position changes from house 503 to timber 502, the color for displaying timber 502 is changed from color B to color C, the color for displaying mountain 501 is changed from color A to color B, the color for displaying house 503 is changed from color C to color D, and the color for displaying car 504 is changed from color D to color E. In addition, person 505 is already displayed with color E which represents the short-distance view, and therefore the color is not changed.

Even this configuration allows the user to easily understand a subject currently in focus. Further, that the user can easily understand how to manually operate focus ring 211 to change a subject to be brought into focus is the same as that of the first exemplary embodiment.

Although an example where distance information is calculated by DFD processing has been described in the first exemplary embodiment, distance information may be calculated by another method. For example, a configuration may be employed where a phase difference sensor is provided on the imaging plane of CMOS image sensor 120 to calculate distance information.

In the first exemplary embodiment, an example where a guide image has a downward opening arc shape provided with arrows at both front ends. However, a guide image may have any shape as long as the guide image has a shape (a shape indicating a rotation direction upon a manual operation) which allows the user to easily understand a rotation direction upon a manual operation of focus ring 211. For example, a guide image may show a linear arrow or simply color-code and display a rectangle.

In addition, specific numerical values and settings described in the exemplary embodiments are simply examples of the exemplary embodiments, the present disclosure is by no means limited to these numerical values and settings. Desirably, each numerical value and setting are optimally set according to, for example, a specification of an imaging apparatus.

The present disclosure is applicable to an imaging apparatus which manually adjusts a focus. More specifically, the present disclosure is applicable to digital still cameras (still image imaging apparatuses), digital video cameras (moving image shooting apparatuses), mobile telephones equipped with camera functions, smartphones and the like.

What is claimed is:

1. An imaging apparatus comprising:
    a display unit;
    an image capturing unit configured to capture a subject image which is formed on an imaging plane and to output image data;
    a distance information obtaining unit configured to obtain distance information of a single subject or each of a plurality of subjects in the image data; and
    a display controller configured to display on the display unit an image based on the image data,
    wherein the display controller is configured to associate a plurality of different colors respectively with a plurality of areas partitioned according to a distance from the imaging apparatus, to determine based on the distance information to which one of the plurality of areas the single subject or the each of the plurality of subjects corresponds, and to display on the display unit each captured subject with the color associated with the area corresponding to the each captured subject.

2. The imaging apparatus according to claim 1, further comprising:
    a focus lens for focus adjustment;
    a focus operation unit configured to receive a manual operation for the focus adjustment; and
    a focus controller configured to drive the focus lens in an optical axis direction according to the manual operation, and to obtain a position of the focus lens as a focus position and to obtain a distance from the imaging apparatus to a subject in focus on the imaging plane, based on the focus position,
    wherein the display controller is configured to display a guide image which indicates an operation direction of the manual operation, on the display unit, and to indicate in the guide image the focus position at present, and a relationship between the operation direction of the manual operation and the focus position which changes according to the manual operation.

3. The imaging apparatus according to claim 2, wherein the display controller is configured to color-code the guide image with the plurality of colors, to associate the focus position which changes according to the manual operation with the plurality of colors, to arrange a color associated with the area which is relatively far, in a portion of the guide image indicating the operation direction of the manual operation in which the focus position moves to a long-distance view side, and to arrange a color associated with the area which is relatively close, in a portion of the guide image indicating the operation direction of the manual operation in which the focus position moves to a short-distance view side.

4. The imaging apparatus according to claim 3, wherein the display controller is configured to arrange a color associated with the area corresponding to a distance to a subject to be obtained from the focus position at present, in a center portion of the guide image, to arrange a color associated with the area which is farther than the distance to the subject to be obtained from the focus position at present, in a portion of the guide image indicating the operation direction of the manual operation in which the focus position moves to a long-distance view compared to a current view, and to arrange a color associated with the area which is closer than the distance to the subject to be obtained from the focus position at present, in a portion of the guide image indicating the operation direction of the manual operation in which the focus position moves to a short-distance view compared to the current view.

5. The imaging apparatus according to claim 3, wherein the display controller is configured to superimpose on the guide image a mark indicating a color associated with an area corresponding to a distance to a subject to be obtained from the focus position at present.

6. The imaging apparatus according to claim 3, wherein the display controller is configured to, when the focus position changes, change a color of a subject which exists in an area corresponding to a distance obtained from the focus position, to a same color as a color arranged in a center of the guide image to display on the display unit.

7. The imaging apparatus according to claim 3, wherein the imaging apparatus is configured to be detachably attached with a lens barrel which includes the focus lens and the focus operation unit.

8. A method of displaying a captured image in an imaging apparatus which generates image data by capturing a subject image which is formed on an imaging plane through a focus lens for focus adjustment, and displays an image based on the image data on the display unit, the method comprising:
    obtaining distance information of a single subject or each of a plurality of subjects in the image data;
    associating a plurality of different colors respectively with a plurality of areas partitioned according to a distance from the imaging apparatus;
    determining based on the distance information to which one of the plurality of areas the single subject or the each of the plurality of subjects corresponds; and
    displaying on the display unit each captured subject with the color associated with the area corresponding to the each captured subject.

9. The method of displaying the captured image according to claim 8, further comprising:
    receiving a manual operation for the focus adjustment;
    driving the focus lens in an optical axis direction according to the manual operation, and obtaining a position of the focus lens as a focus position and obtaining a distance from the imaging apparatus to a subject in focus on the imaging plane, based on the focus position; and
    displaying a guide image which indicates an operation direction of the manual operation on the display unit, and indicating in the guide image the focus position at present, and a relationship between the operation direction of the manual operation and the focus position which changes according to the manual operation.

10. The method of displaying the captured image according to claim 9, further comprising:
    color-coding the guide image with the plurality of colors;
    associating the focus position which changes according to the manual operation with the plurality of colors;
    arranging a color associated with the area which is relatively far, in a portion of the guide image indicating the operation direction of the manual operation in which the focus position moves toward a long-distance view side; and arranging a color associated with the area which is relatively close, in a portion of the guide image indicating the operation direction of the manual operation in which the focus position moves toward a short-distance view side.

11. The method of displaying the captured image according to claim 10, further comprising:

arranging a color associated with the area corresponding to a distance to a subject to be obtained from the focus position at present, in a center portion of the guide image;

arranging a color associated with the area which is farther than the distance to the subject to be obtained from the focus position at present, in a portion of the guide image indicating the operation direction of the manual operation in which the focus position moves to a long-distance view compared to a current view; and arranging a color associated with the area which is closer than the distance to the subject obtained from the focus position at present, in a portion of the guide image indicating the operation direction of the manual operation in which the focus position moves to a short-distance view compared to the current view.

* * * * *